United States Patent [19]
Karas

[11] Patent Number: 6,009,695
[45] Date of Patent: Jan. 4, 2000

[54] MOBILE APPARATUS FOR CUTTING AND TRIMMING OF HEDGES

[76] Inventor: Deno Karas, 106 William St., Stamford, Conn. 06830

[21] Appl. No.: 09/072,481

[22] Filed: May 4, 1998

[51] Int. Cl.[7] ..................................... A01G 3/04
[52] U.S. Cl. ............................. 56/237; 56/16.7
[58] Field of Search ............... 56/233, 234, 235, 56/236, 237, 17.6, 16.7; 30/276

[56] References Cited

U.S. PATENT DOCUMENTS

| | | | |
|---|---|---|---|
| 2,762,186 | 9/1956 | Janata | 56/237 |
| 3,731,476 | 5/1973 | Burgess | 56/237 |
| 3,805,501 | 4/1974 | Cole | 56/237 |
| 4,174,604 | 11/1979 | Wilson, Sr. et al. | 56/237 |
| 5,070,685 | 12/1991 | Galt | 56/16.7 |
| 5,251,428 | 10/1993 | Gay | 56/16.7 |

*Primary Examiner*—Robert E. Pezzuto
*Attorney, Agent, or Firm*—Alfred E. Miller

[57] ABSTRACT

A mobile carriage for a powered hedge or bush trimmer in which both straight and curved or round cuts can be achieved. The hedge trimmer can be moved manually in a curved guide so that the hedge can be configured with a curved top as well as curved sides or a curved cop and straight sides. A multitude of cut designs are possible with the apparatus.

3 Claims, 4 Drawing Sheets

MOBILE APPARATUS FOR CUTTING AND TRIMMING OF HEDGES

The present invention relates to a mobile apparatus or device for cutting and trimming hedges or bushes in site plantings.

BACKGROUND OF THE INVENTION

Wheeled devices for assisting in the trimming of hedges are known such as U.S. Pat. No. 3,805,501 to Cole; U.S. Pat. No. 3,703,803 to McClure and U.S. Pat. No. 4,174,604 to Wilson, Sr. et al. All of the devices shown and described in the foregoing patents employ an electric hedge clipper or trimmer on a movable carriage in which the clipper to some extent can be adjusted to cut the sides and top of a hedge with a straight cut so that the top and sides of the hedges are always straight. None of the foregoing patents are provided with a telescoping assembly mounted on a wheeled carriage having a vertical bar and a horizontal bar that can be rotated to a multitude of positions for linear and angular cuts on a hedge, as well as a round cutting guide for uniform curved cuts on a hedge.

SUMMARY OF THE INVENTION

It is a feature of the present invention to provide a mobile carriage for mounting a hedge trimming assembly whereby hedges can be cut with straight sides and a rounded top as well as a multitude of hedge or bush configurations including a completely rounded hedge or bush. In addition, cuts are possible for straight tops and sides of hedges.

It is another object of the present invention to provide a guide for an electric hedge trimmer which is interchangeable on a horizontal slidable bar having a curved cut-out for receiving a hedge trimmer which moves in said cut-out thereby ensuring a uniform round top cut for the hedge.

It is a further feature of the present invention to provide a slidable and rotatable horizontal bar whereby an electric hedge clipper can be adjusted to cut both straight or linear cuts as well as angular cuts so that the sides of hedges can be trimmed so that the width of the hedge can be smaller at the bottom than on the top, so that the hedge can have an inverted pyramid appearance.

It is another object of the present invention to provide a mobile hedge cutting aid that can be used universally on various electric or gasoline hedge clippers.

Another feature of the present invention is to provide a wheeled carriage apparatus which has a multiplicity of adjustments permitting it to be used on all sizes and shapes of hedges.

Various other objects, features and advantages of the present invention will become apparent to those skilled in the art from the foregoing, as well as the following descriptions of the details of the invention taken with the accompanying drawings, which constitute a part thereof.

DESCRIPTION OF THE PREFERRED EMBODIMENTS

The present invention relates to a hedge cutting and shaping apparatus that is mounted on a wheeled carriage for moving adjacent to hedges and bushes in order to cut and shape the same, and, at the same time considerably reducing the physical effort necessary to accomplish this objective.

Figure 1:
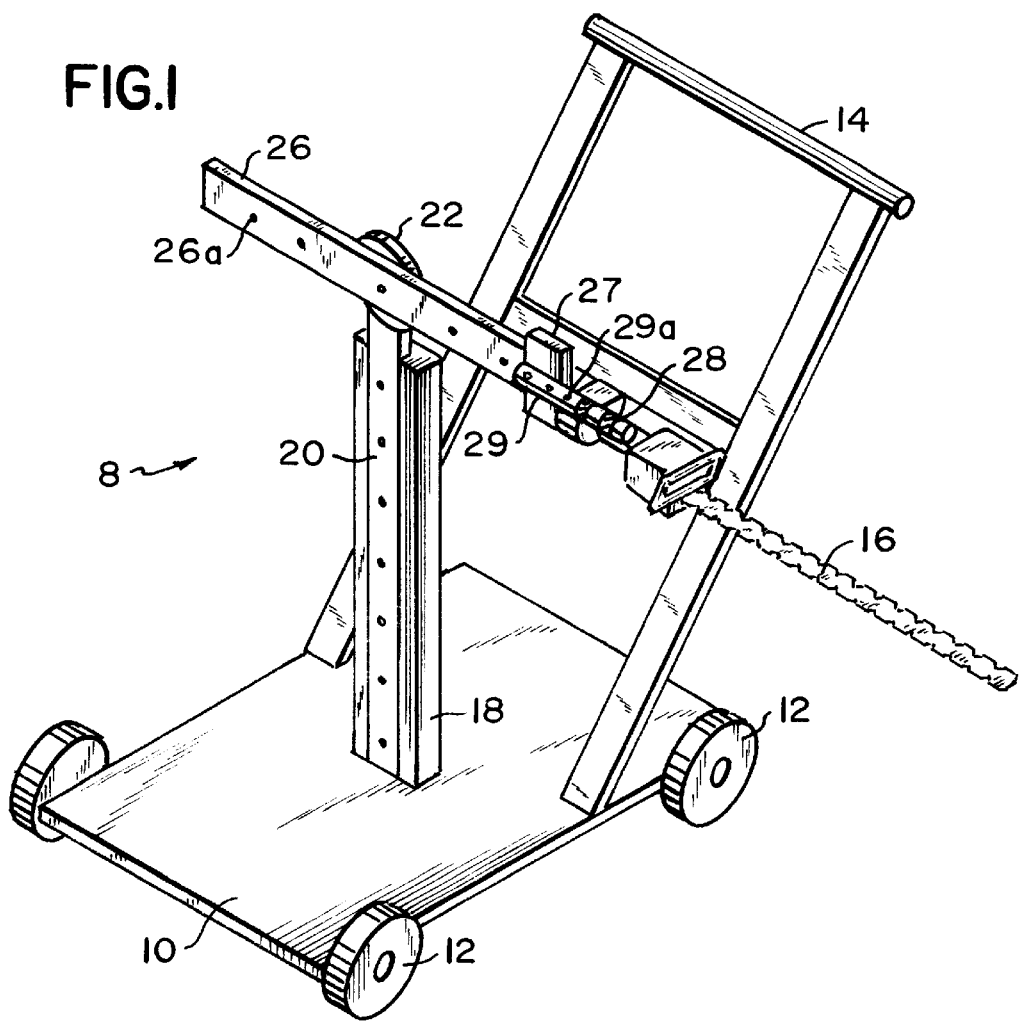
FIG. 1 is a perspective view of the mobile apparatus for cutting and trimming hedges in accordance with the teachings of my invention.
Figure 5:
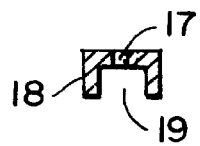
FIG. 5 is a top view of the vertical column.
Figure 5A:
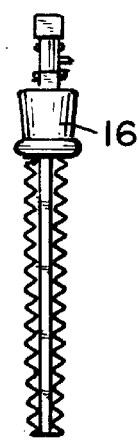
FIG. 5A is a hedge clipper of the type employed with the present invention.

The mobile cutting apparatus shown is referred to generally by the reference numeral 8, and is provided with a plate-like base member 10 having four wheels 12 and a handle 14 so that base member 10 and associated structure can be manually pushed adjacent to a hedge or bush. The base 10 is provided with a c-shaped vertical column 18 that is best seen in FIGS. 1 and 5. The column 18 is provided with a series of spaced holes 17 in the rear wall of column 18. Adapted to fit and slide within the "c" opening 19 is an elongated vertically slidable bar 20, which has a round support head 22 at the top of the vertical bar. The round support head is provided with spaced mounting holes 24 and the bar 20 also has spaced holes 25 which are so located as to be aligned with the spaced holes 17 in the rear wall of column 18. It should be apparent that vertical sliding bar 20 can be moved in the "c" opening 19 up or down in order to achieve the proper elevation of the support head 22, which will be more fully explained hereafter. Bolts (not shown) can be placed "through the aligned holes 17 and 25 in order to secure the vertical sliding bar 20 in the selected position in the column 18.

Figure 2:
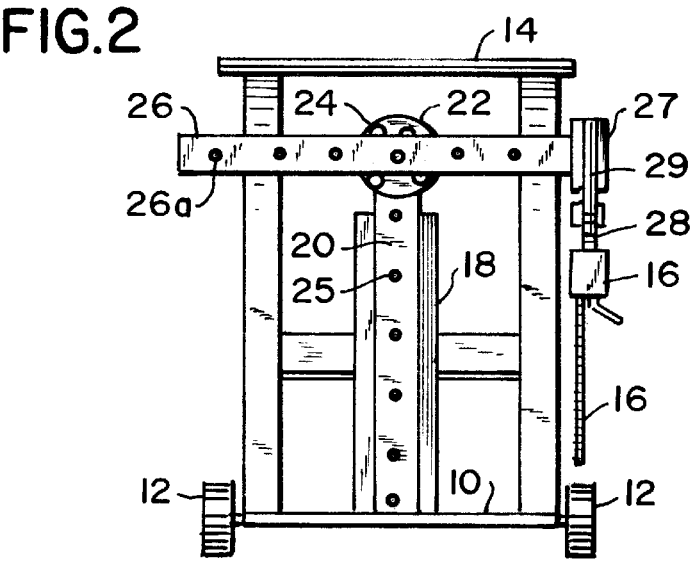
FIG. 2 is a front elevational view of the apparatus of FIG. 1 in which a hedge trimmer is in a vertical cutting position.
Figure 3:
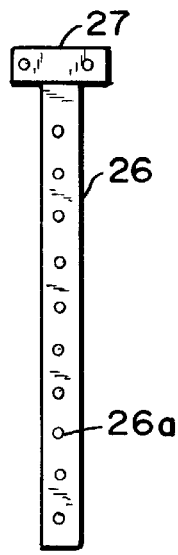
FIG. 3 is a front elevational view of the horizontal bar of the present apparatus.
Figure 4:
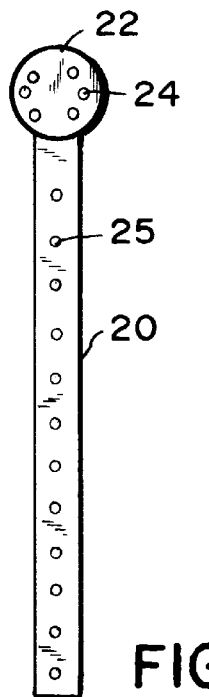
FIG. 4 is a front elevational view of the vertical bar of the present apparatus.

As seen in FIGS. 1, 2 and 3, a horizontal sliding bar 26 is T-shaped and having a short perpendicular mounting block 27 at one end. The bar 26 has a series of spaced holes 26a, and the bar 26 is also mounted on support head 22 with bolts (not shown) passing through selected holes 24 depending on the selected position and orientation of the horizontal sliding bar 26. An electric or gas hedge trimmer of a well-known type is removably secured to the horizontal sliding bar 26 by an intermediate hedge clipper connector bar 29 by means of hose clamps 28, while the connector bar 29 is also removably attached, at the other end to mounting block 27 on the horizontal sliding bar 26.

It should be noted that the hedge clipper 16 can be mounted on the wheeled carriage to be positioned pointing downward, upwards or horizontal, in order to cut the hedges on the sides and top. In addition, the hedge clipper 16 can be mounted at an angle to the hedge by means of selecting the proper holes 24 in the support head 22 of the vertical bar 20 and placing a bolts (not shown) through the holes.

Figure 6:
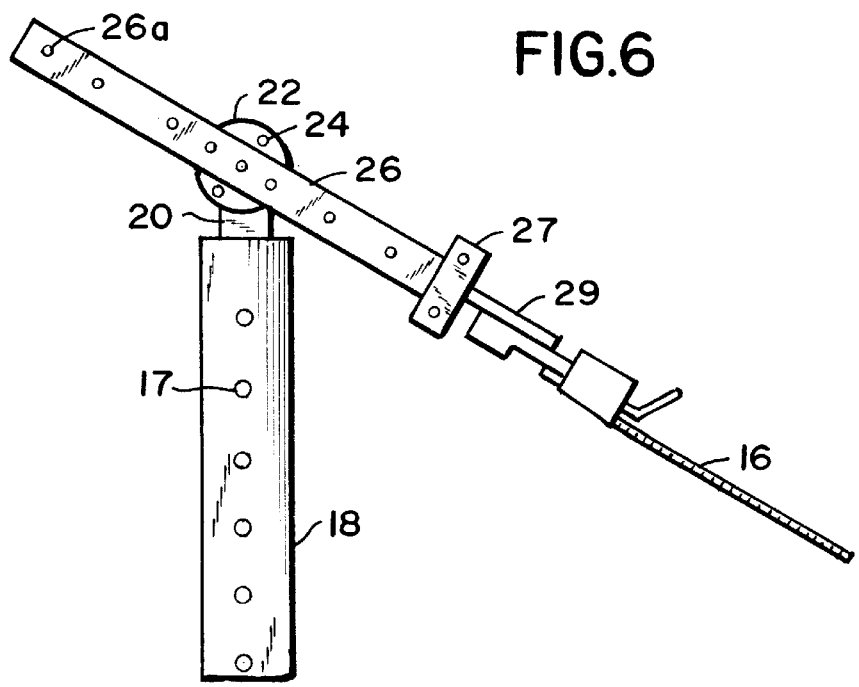
FIG. 6 is a partial perspective view of the apparatus show in FIG. 1 in which the hedge trimmer is shown operatively connected to the round support head at an angle relative to the hedge to be cut.

Referring now to FIG. 6, the hedge clipper 16 is shown in position angularly with relation to the hedge or bush to be cut. This is accomplished by mounting the normally horizontal bar 26 in different mounting holes on the round support head 22. It should be evident that a variety of cutting positions are possible because of the telescoping vertical bar 20 as well as the adjustable sliding horizontal bar 26 mounted on a support head 22 having several mounting positions.

Figure 7:
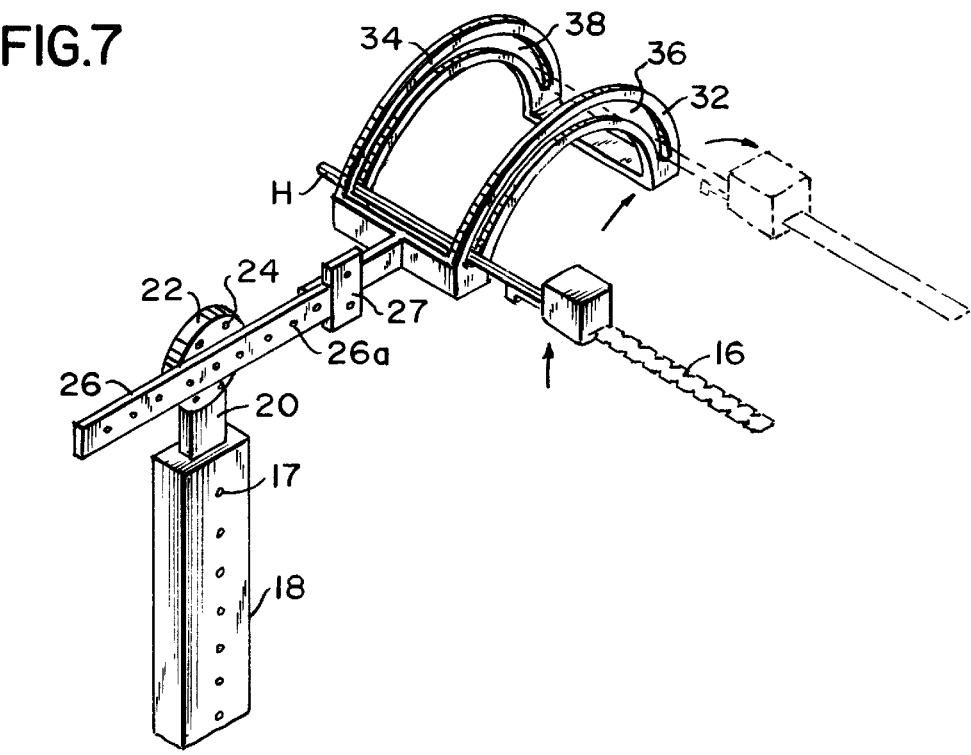
FIG. 7 is a partial perspective view of an embodiment of the present invention employing a curved guide attachment for trimming hedges in a curved convex configuration.
Figure 8:
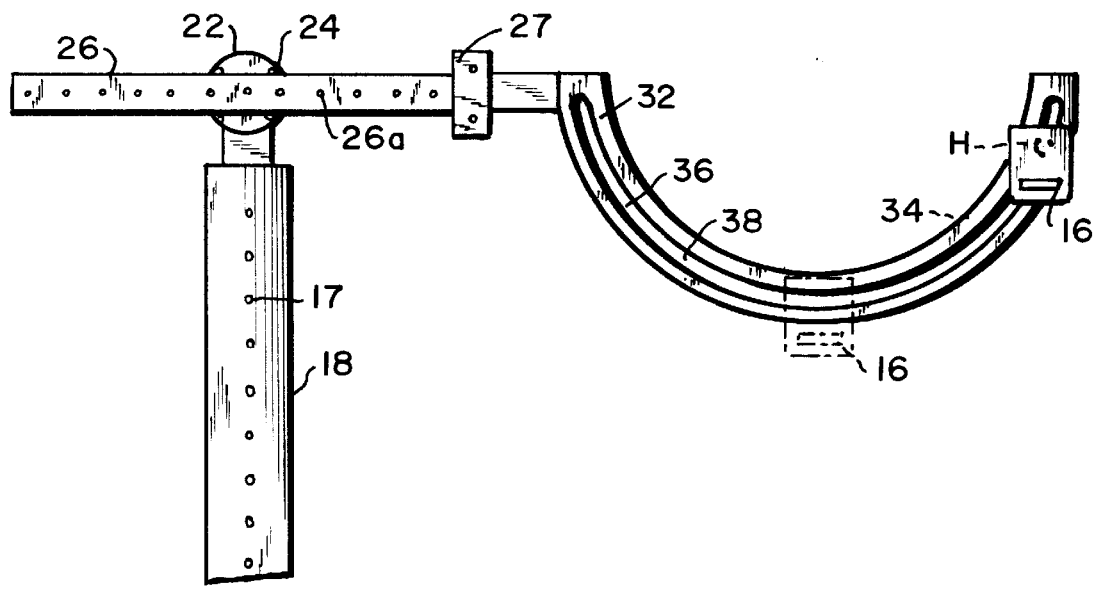
FIG. 8 is a partial perspective view of an embodiment of the present invention employing the guide shown in FIG. 7 in a configuration which is 180 degree change in position from that which is shown in FIG. 7.
Figure 9:
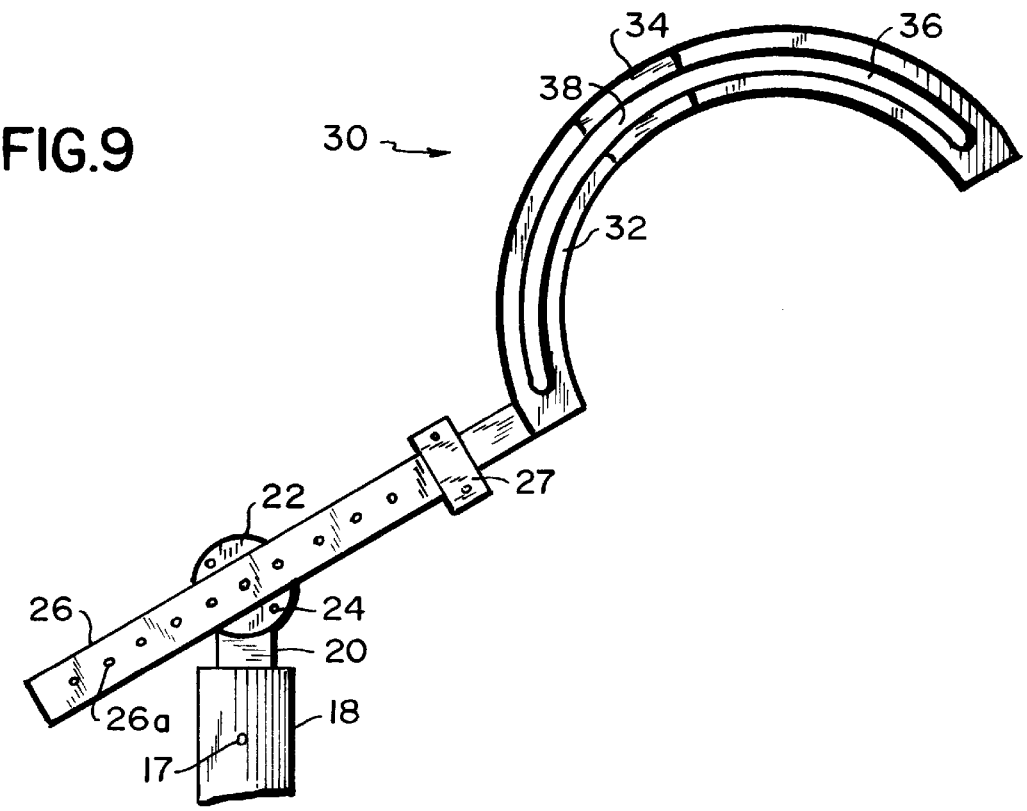
FIG. 9 is a partial perspective view showing the guide of FIG. 7 in an angular position and FIG. 10 is a partial perspective view showing the guide of FIG. 7 in a downward position for rounding the sides of hedges.
Figure 10:
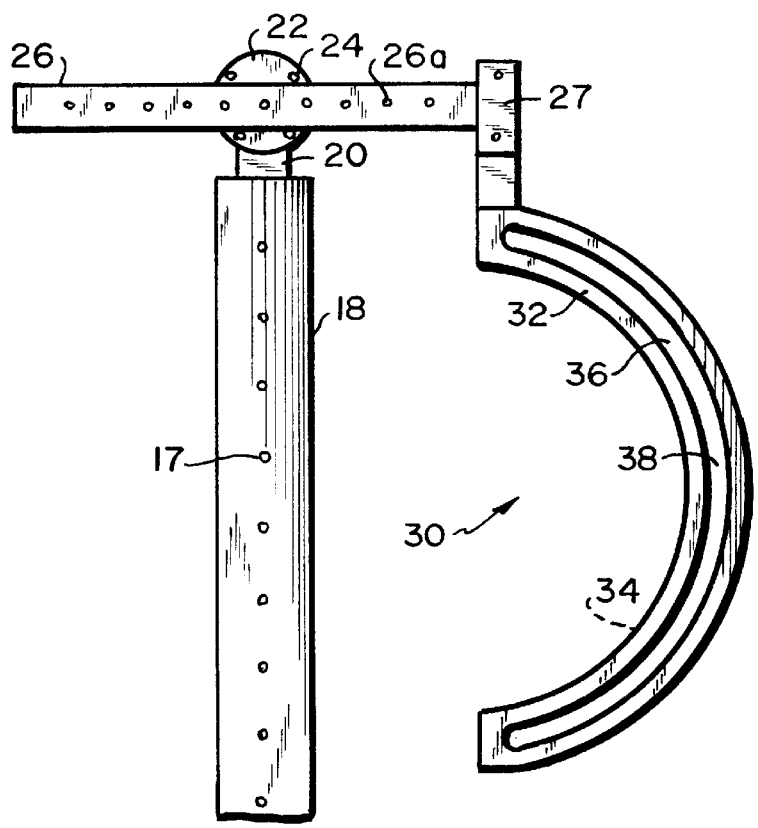

FIGS. 7–10 show a curved guide or template attachment referred to generally by the reference numeral 30 that is utilized for trimming hedges or bushes for a curved or round configuration. The construction involves a pair of spaced guide members 32 and 34 that have aligned guide slots 36 and 38 so that the hedge trimmer handle H can be moved in the aligned guide slots 36 and 38. As seen in FIG. 7, the guide 30 is positioned to permit the hedge clipper handle H to be moved along the guide slots 36 and 38 to cut or clip the top of a hedge or a bush to a rounded configuration. In FIG. 8 the guide is inverted 180° so that, for example, the top of a hedge can be cut to a concave configuration. It should also be noted from FIG. 9 that angular positions may be assumed by the guide so that selected areas of a bush or hedge can be rounded by moving the hedge clipper in the aligned guide slots 36 and 38. If it is required that the sides of the hedges are to be rounded, the guide is placed in the position shown in FIG. 10.

It is apparent that the operator of the present apparatus can select a variety of positions of the hedge trimmer so that both straight cuts and rounded cuts can be achieved whereby the hedges and bushes can assume a multitude of shapes, and at the same time the movable carriage permits the accomplishment of trimming and cutting of hedges with reduced effort compared to manual clipping with an electric or gas powered hedge trimmer.

The conception upon which the present disclosure is based may be utilized as a basis for other structures, apparatus and systems for carrying out the several purposes of the present invention. It is important, therefore, that the following claims be regarded as including equivalent constructions insofar as they do not depart from the spirit and scope of the present invention.

What is claimed is:

1. A mobile apparatus for cutting and trimming hedges including a powered hedge trimmer provided with an elongated handle and comprising: a base, ground engaging wheels mounted to said base, handle means mounted on said base and providing mobility for said base, a vertical column mounted on said base and having an elongated channel, an elongated bar telescoping within said channel, means on said column and bar for fixing said bar in said column at a selected elevation, said bar having a support head at one end thereof, a cross bar provided with means for attachment to said support head for both horizontal and angular positions, a hedge trimmer guide, means for attaching said guide to said cross bar, said guide having two spaced and aligned curved slots, and at least a part of the handle of said hedge trimmer moves in said aligned curved slots to cut a hedge to a round configuration.

2. A mobile apparatus as claimed in claim 1, wherein said support head is provided with a multiplicity of attachment locations whereby said cross bar can be removably secured to said support head for both horizontal, vertical and angular positions.

3. A mobile apparatus as claimed in claim 2 wherein said support head is round and said attachment locations are around and adjacent to the circumference of said support head.

* * * * *